US012725374B1

(12) United States Patent
Libin

(10) Patent No.: US 12,725,374 B1
(45) Date of Patent: Sep. 1, 2026

(54) USING AUGMENTED REALITY HEADSET FOR GENERATION AND REPLAY OF MODIFIED USER APPEARANCE IN THE MIRROR

(71) Applicant: All Turtles Corporation, Little Rock, AR (US)

(72) Inventor: Phil Libin, Bentonville, AR (US)

(73) Assignee: All Turtles Corporation, Bentonville, AR (US)

( * ) Notice: Subject to any disclaimer, the term of this patent is extended or adjusted under 35 U.S.C. 154(b) by 131 days.

(21) Appl. No.: 18/751,433

(22) Filed: Jun. 24, 2024

Related U.S. Application Data

(60) Provisional application No. 63/512,080, filed on Jul. 6, 2023.

(51) Int. Cl.
*G06T 19/00* (2011.01)
*G06F 3/01* (2006.01)
*G06T 19/20* (2011.01)

(52) U.S. Cl.
CPC ............ *G06T 19/006* (2013.01); *G06F 3/013* (2013.01); *G06T 19/20* (2013.01); *G06T 2219/2012* (2013.01); *G06T 2219/2016* (2013.01)

(58) Field of Classification Search
CPC .................. G06T 19/006; G06T 19/20; G06T 2219/2012; G06T 2219/2016; G06F 3/013
See application file for complete search history.

(56) References Cited

U.S. PATENT DOCUMENTS

| | | | | |
|---|---|---|---|---|
| 11,145,135 | B1 * | 10/2021 | Ng | G06F 3/017 |
| 2014/0176565 | A1 * | 6/2014 | Adeyoola | G06F 18/22 345/473 |
| 2017/0206691 | A1 * | 7/2017 | Harrises | G02B 27/0172 |
| 2022/0301041 | A1 * | 9/2022 | Lee | G06F 9/453 |
| 2023/0206531 | A1 * | 6/2023 | Agura | G06T 11/001 345/473 |
| 2025/0124650 | A1 * | 4/2025 | Cao | G06V 10/70 |

* cited by examiner

*Primary Examiner* — Daniel F Hajnik
*Assistant Examiner* — Joshua Jungwook Suo
(74) *Attorney, Agent, or Firm* — Westborough IP Group, LLC

(57) ABSTRACT

Using augmented reality to present a modified appearance of a user wearing an AR headset includes detecting the user in a reflective surface, the AR headset presenting to the user, in response to the user being detected in the reflective surface, an image of the user in the reflective surface in which the user is not wearing the AR headset, applying modifications and transformations to the image of the user, and the AR headset presenting to the user an image of the user with the modifications and transformations. The modifications and transformations may include modification of clothes, head-wear, footwear, cosmetics, or makeup. The user may be presented with a control mechanism and a floating menu that the user actuates to perform changing the modifications and transformations, rotating the image of the user, viewing the image of the user from different angles, or change a viewing distance of the user image.

18 Claims, 6 Drawing Sheets

USING AUGMENTED REALITY HEADSET FOR GENERATION AND REPLAY OF MODIFIED USER APPEARANCE IN THE MIRROR

CROSS-REFERENCE TO RELATED APPLICATIONS

This application claims priority to U.S. Prov. App. No. 63/512,080, filed on Jul. 6, 2023, and entitled "USING AUGMENTED REALITY HEADSET FOR GENERATION AND REPLAY OF MODIFIED USER APPEARANCE IN THE MIRROR", which is incorporated herein by reference.

TECHNICAL FIELD

This application is directed to the field of information processing and user interfaces, and more particularly to the field of using augmented reality headset to recognize and preprocess user reflection in a mirror and to create, navigate and edit modified user appearances in the mirror.

BACKGROUND OF THE INVENTION

Hybrid lifestyle is transforming the contemporary workplace, communications, entertainment, and other areas of our lives, fueled by the emergence of the global distributed workforce and an out-of-the-office work style, owing to the consequences of the Covid-19 pandemic, to advances in remote communications and other socio-economic and technological factors. Hybrid companies and teams, hybrid presentations and communications, hybrid approach to education and training bring closer the future where the physical and the virtual reality, the synchronous and the asynchronous processes are irreversibly intertwined and are coexisting in our everyday lives.

Hybrid vehicles, power generators, computer drives, communications, organisms, music events are playing increasing roles in modern life. The contemporary language reflects growing popularity of the mix of physical and virtual worlds as one of the core properties of hybrid systems: four out of ten contemporary uses of the term "hybrid" in Wikipedia's disambiguation section are associated with the mix of physical and electronic components of systems and processes.

Augmented Reality (AR) systems, technologies, and devices represent a promising type of hybrid systems, featuring a combination of real and virtual worlds at their core. AR systems combine physical and virtual worlds in hybrid environments that enrich user experiences and create the promise of breakthrough advancements in industrial applications, education, medicine, gaming and entertainment, and many other areas. The techniques used in the AR systems include Multimedia, 3D modeling, real-time tracking and registration of physical and virtual objects, intelligent interaction, sensing, environment control via spatial and touch gestures, eye tracking, voice recognition, and more.

AR is increasingly used in manufacturing, healthcare, and architecture, often as a 3D modeling and spatial presentation tool. AR can assist in tasks like remote assistance, training simulations, visualization of complex data, and more. Another broad area of AR applications is gaming and entertainment where a popular application Pokemon Go overlays virtual creatures onto the real world using a smartphone's camera.

According to recent market research, AR&VR market is projected to grow by revenue from $31B in 2023 to $52B in 2027 the CAGR 13.7% through this period. It is expected that by 2027 AR applications will reach over 2.5 billion users worldwide. Forecasts for the AR&VR market may be significantly exceeded with the proliferation of a new blend of AR&VR technologies, advanced sensors, software applications, and other technological advances collectively known as spatial computing. While the notion of spatial computing has originated in early- to mid-1980's and was originally applied to processing of large-scale geospatial information, modern spatial computing is predominantly human-centric and focused on the human area of interaction, such as the living room interfaces. The latest example of the spatial technology was manifested by the introduction of the Apple Vision Pro AR headset and an extensive suite of hardware and software technologies powering AR applications with the Apple Vision Pro.

SUMMARY OF THE INVENTION

Notwithstanding significant innovations in creation and interaction with AR environments, many open questions and unexplored opportunities remain. Of particular importance for the new generation of immersive AR devices and spaces are deep, organic AR interactions when virtual objects are amalgamated with a physical environment and virtual objects augment properties of other virtual objects.

Accordingly, it is useful to develop techniques and systems for hybrid AR environments where VR properties created by immersive AT technologies directly interact with properties of a physical environment.

According to the system described herein, using augmented reality to present a modified appearance of a user wearing an AR headset includes detecting the user in a reflective surface, the AR headset presenting to the user, in response to the user being detected in the reflective surface, an image of the user in the reflective surface in which the user is not wearing the AR headset, applying modifications and transformations to the image of the user, and the AR headset presenting to the user an image of the user with the modifications and transformations. The modifications and transformations may include modification of clothes, headwear, footwear, cosmetics, and/or makeup. The user may be presented with a control mechanism and a floating menu that the user actuates to perform changing the modifications and transformations, rotating the image of the user, viewing the image of the user from different angles, and/or change a viewing distance of the image of the user. The control mechanism and the floating menu may allow the user to alter color, texture, material, fashion, and size options for attire, headwear position on a head of the user, and/or an option of removing headwear. The user may control the control mechanism and the floating menu using spatial gestures, eye tracking, and/or voice commands. The image of the user may include a model of a head of the user obtained by the AR headset combined with a model of a body of the user. The model of the body of the user may initially be chosen from a repository containing models based on parameters that include body type, age, height, and basic dimensions. The user may choose the model from the repository. Visible features of the AR headset may be used to determine distance and rotation of the user with respect to the reflective surface and the distance and the rotation may be used in connection with presenting an image of the user in the reflective surface. The AR headset may have a display that provides an indication of the model of the headset that is used in connection with determining distance and rotation of the user with respect to the reflective surface and the distance and the rotation may be used in connection with presenting an image of the user in the reflective surface. The indication may be a QR code. The AR headset may have a display that provides a series of geometric configurations that are used to determine distance and rotation of the user with respect to the reflective surface and the distance and the rotation may be used in connection with presenting an image of the user in the reflective surface.

According further to the system described herein, a non-transitory computer readable medium contains software that uses augmented reality to present a modified appearance of a user wearing an AR headset. The software includes executable code that detects the user in a reflective surface, executable code that causes the AR headset to present to the user, in response to the user being detected in the reflective surface, an image of the user in the reflective surface in which the user is not wearing the AR headset, executable code that applies modifications and transformations to the image of the user, and executable code that causes the AR headset to present to the user an image of the user with the modifications and transformations. The modifications and transformations may include modification of clothes, headwear, footwear, cosmetics, and/or makeup. The user may be presented with a control mechanism and a floating menu that the user actuates to perform changing the modifications and transformations, rotating the image of the user, viewing the image of the user from different angles, and/or change a viewing distance of the image of the user. The control mechanism and the floating menu may allow the user to alter color, texture, material, fashion, and size options for attire, headwear position on a head of the user, and/or an option of removing headwear. The user may control the control mechanism and the floating menu using spatial gestures, eye tracking, and/or voice commands. The image of the user may include a model of a head of the user obtained by the AR headset combined with a model of a body of the user. The model of the body of the user may initially be chosen from a repository containing models based on parameters that include body type, age, height, and basic dimensions. The user may choose the model from the repository. Visible features of the AR headset may be used to determine distance and rotation of the user with respect to the reflective surface and the distance and the rotation may be used in connection with presenting an image of the user in the reflective surface. The AR headset may have a display that provides an indication of the model of the headset that is used in connection with determining distance and rotation of the user with respect to the reflective surface and the distance and the rotation may be used in connection with presenting an image of the user in the reflective surface. The indication may be a QR code. The AR headset may have a display that provides a series of geometric configurations that are used to determine distance and rotation of the user with respect to the reflective surface and the distance and the rotation may be used in connection with presenting an image of the user in the reflective surface.

The proposed system modifies a user appearance in the mirror by capturing user reflections when a user looks in the mirror with an AR headset of the user turned on and displaying modified reflections that hide the AR headset, invoking head and body models of the user; the modified reflections may alter user clothing and makeup, add virtual reflected objects that may be models of the existing things in a home or work environment of the user; generate and display within modified reflections new recommended objects helpful for current or upcoming presentations where modified reflections may be automatic or controlled by the user via spatial gestures, eye tracking, voice commands, etc.

Various aspects of system functioning are explained as follows.

1. An AR headset may build a set of adaptive 3D VR head models of a user (altered with a change of hairstyle, seasonal and cosmetic-driven changes to the face, and other modifications). The AR software may also assist in building a 3D body model of a user, as explained below. Alternatively, the user may choose an appropriate type of body model from a VR repository based on the body type, age, height, basic dimensions, and other parameters of the user that may be entered by the user, measured independently from the AR headset or through using features and software of the AR headset.
2. When a user looks into the mirror wearing an AR headset, the AR system associated with the headset may recognize the phenomenon of reflection of the user and the headset and may further use the reflection of the AR headset as a recognizable reference object to boosts recognition capabilities and accuracy by utilizing a module based on geometric and other physical characteristics of the AR headset as follows:
   a. A particular configuration of visible features on the headset may be used to compute distance and rotation.
   b. For headsets with an external display (like the Apple Vision Pro or Goovis G3), the headset may temporarily modify the display to aid with recognition, for example,
      (i) a QR code shown on the external display and recognized from the reflection (after the correction for a mirrored image) helps identify the particular model of the AR headset with a unique geometry and direct the recognition module to a particular branch of an algorithm;
      (ii) a series of geometric configurations may be displayed on the external display and recognized from a reflection of the display in a quick sequence, with asymmetry of the recognized images showing rotation and assisting in quick calculation of the view angle.
3. After the reflection geometry (distance to the mirror, view angle(s)) and the lighting effects are recognized, the AR system may restore (synthesize) the natural user reflection, as if the headset was absent, using the recognized reflection and geometric parameters of the reflection, along with the appropriate head model of the user. The AR system may further project the 3D body model of the user onto the natural user reflection, potentially correcting one or both items, the body model and/or the reflection of the body model, to establish an optimal correspondence between the head and the body models.
4. Once the natural user reflection has been restored, the system may modify the natural reflection, for example, by presenting to the user different clothing, headwear, footwear (if the full height of the user is reflected in the mirror and the reflection of the footwear is present), makeup options, accessories, etc. Both the system and the user may choose multiple presentation scenarios for the transformed natural reflections. Such transformed reflections may be initially built based on the 3D body and head models and subsequently projected upon the 2D reflection images, as explained in section 3.
5. The system may offer to the user customization options and control tools over the presentations of alternative reflections. Thus, spatial floating menus may alter color, texture, material, fashion, and size options for the attire, headwear position on the head of the user or and option of taking off a headwear item. Menu controls may be invoked using spatial gestures, eye tracking, voice commands, etc.

6. Other applications of the alternative reflection sequences may include demonstrations of attachments of new wearable devices, bandages, of spreading ointments, etc.
7. The system may choose a particular type of presentation of alternative reflection sequences (see Section 4 above) either automatically, driven by external presentation conditions and sources, such as e-commerce or other advertisement or recommendations, including friends, family or social networks, or based on the individual user status, plans, and schedules of activities and events, external conditions (such as weather), the history of past user choices, and other circumstances.
8. If the correspondence between the natural user reflection and the 3D body model(s) established in section 3 are suboptimal and don't allow creation of the adequate modified reflections, the AR headset and the associated system may assist the user in building an advanced 3D body model by capturing multiple user reflections from different distances and view angles, whereby user positions and body turns are prompted by the AR headset. After obtaining the reflections, the system restores the 3D body model from the corresponding projections.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein offers a modified user appearance in the mirror by capturing user reflections when a user looks in the mirror with wearing an AR headset that is turned on, restoring a natural user reflection without the headset, displaying modified reflections that hide the AR headset, and allowing navigation between, and control within, resulting virtual presentations.

Figure 1:
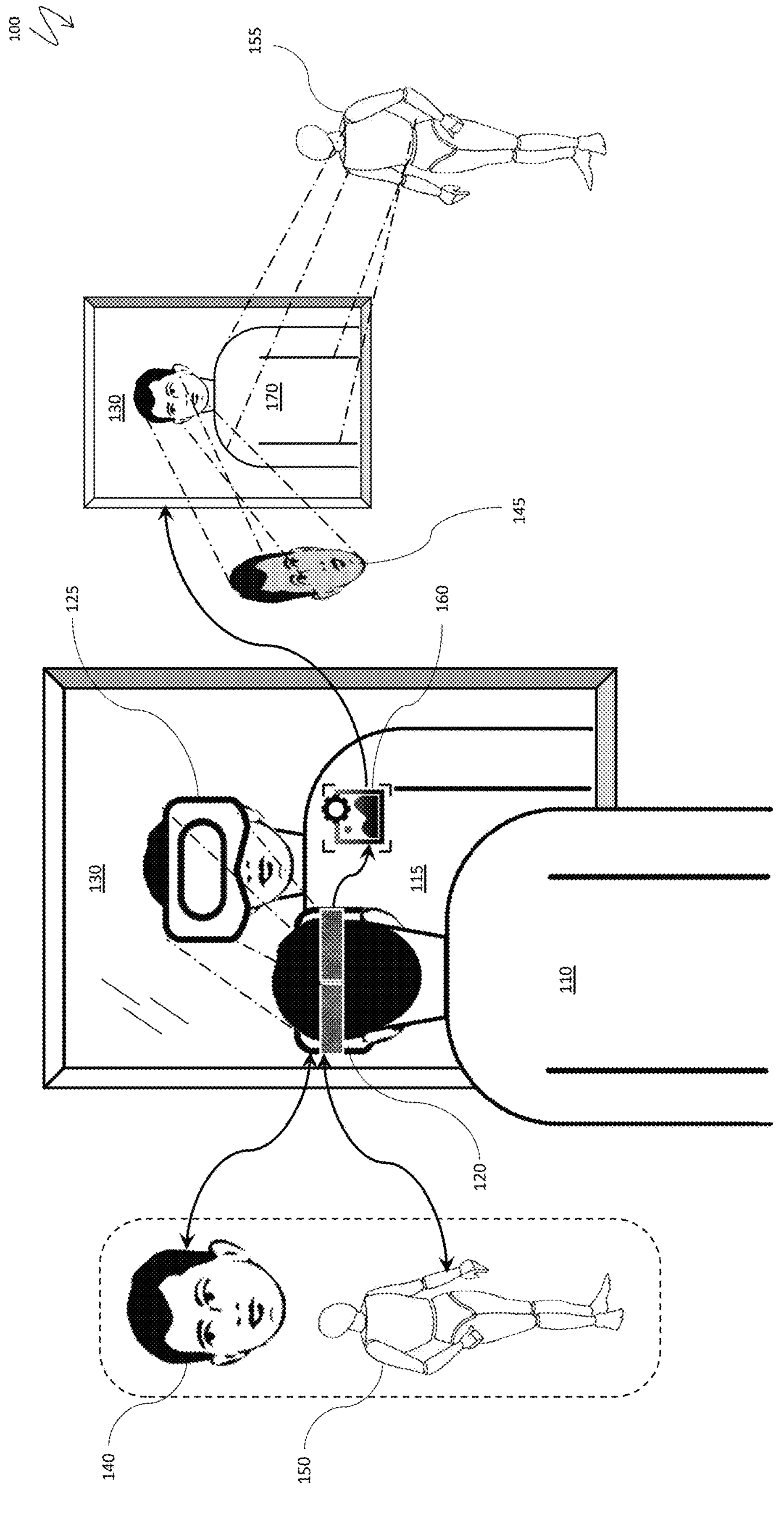
FIG. 1 is a schematic illustration of system components and preprocessing, according to an embodiment of the system described herein.

FIG. 1 is a schematic illustration 100 of components and preprocessing of the system described herein. A user 110 wearing an AR headset 120, is looking at a reflection 115 of the user 110 and a reflection 125 of the AR headset 120 in a mirror 130. A 3D, 2.5D or 2D model 140 of the head of the user 110 has been created at an earlier time using the system associated with the AR headset 120. One or multiple 3D, 2.5D or 2D body models 150 may have been created by the system associated with the AR headset 120 at a different time or may have been selected from a repository of models utilizing user body type, dimensions, and other parameters. Upon applying an image recognition technology component 160 running as part of software of the AR headset 120 to recognize the reflections 115, 125 of the user 110 and of the AR headset 120 in the mirror 130 and performing intermediate steps, explained elsewhere herein (see, for example, Sections 2, 3 of the Summary), the system projects adjusted head model(s) 145 and adjusted body model(s) 155 on the mirror 130 and synthesizes a natural user reflection 170, showing the user 110 without the AR headset 120. The natural user reflection 170 represents what is presented to the user 110 by the AR headset 120 (i.e., what is seen by the user 110 through the AR headset 120). Note that, in some embodiments, the natural user reflection 170 may be made visible to other users having an AR headset and/or having other appropriate electronic devices for viewing the natural user reflection 170.

Figure 2:
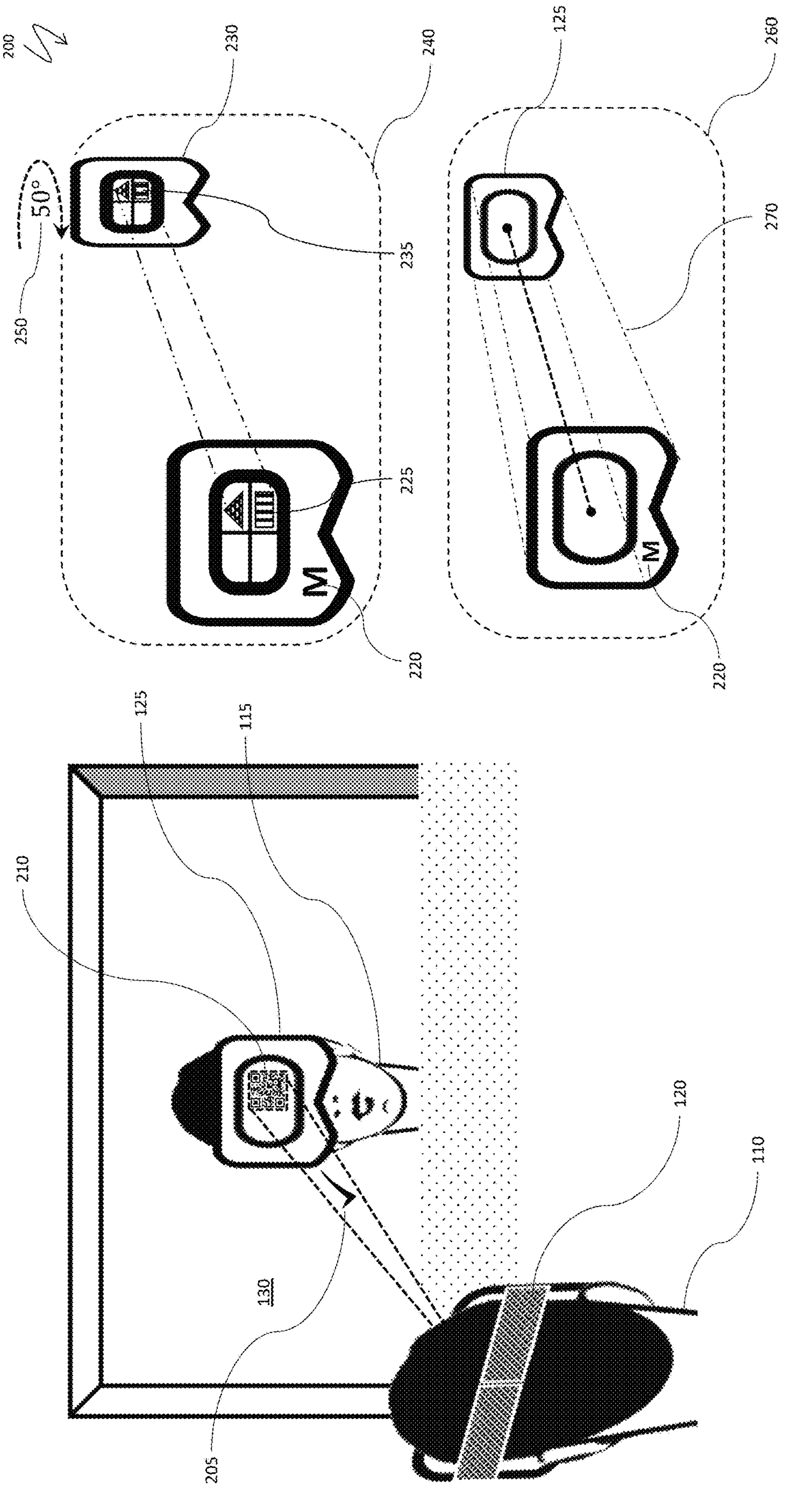
FIG. 2 is a schematic illustration of an AR headset as a recognizable reference object, according to an embodiment of the system described herein.

FIG. 2 is a schematic illustration 200 of an AR headset 120 as a recognizable reference object. Analogously to FIG. 1, the user 110 wearing the AR headset 120, is looking at the reflection 115 of the user 110 and the reflection 125 of the AR headset 120 in the mirror 130. Once the image recognition system (not shown in FIG. 2, see FIG. 1 and the accompanying text for details) has recognized the presence of the reflection 125 of the AR headset 120 in the mirror 130, as symbolized by a checkmark 205, the AR headset 120 generates on an external display of the AR headset 120 a mirror image of a QR code or other code identifying a model of the AR headset 120. Note that the mirror image is not shown in FIG. 2.

A code recognition component of the software of the AR headset 120 finds and recognizes a reflection 210 of the QR code in the mirror 130 (upon reflecting in the mirror, the reflection 210 represents the proper QR code), identifies a model 220 of the AR headset 120, and captures geometric and other parameters of the AR headset 120 as software data for the current workflow. By comparing the parameters of the model 220 of the AR headset 120, where additional images 225 are generated on the external display (see Section 2b of the Summary), with reflections 230, 235 of the AR headset 120, and of the images, the system may solve a task 240 of restoring a view angle; a rotation angle 250 is shown above the reflection 230 of the AR headset 120. Note that the task 240 may also use optical parameters of the mirror 130.

Analogously, the system may solve a task 260 of calculating a distance between the user 110 and the mirror 130 by building a spatial perspective chart 270 for the identified AR headset model 220 and the original reflection 125 in the mirror 130 (optical parameters of the mirror 130 may also be required similar to requirements for the task 240).

Figure 3:
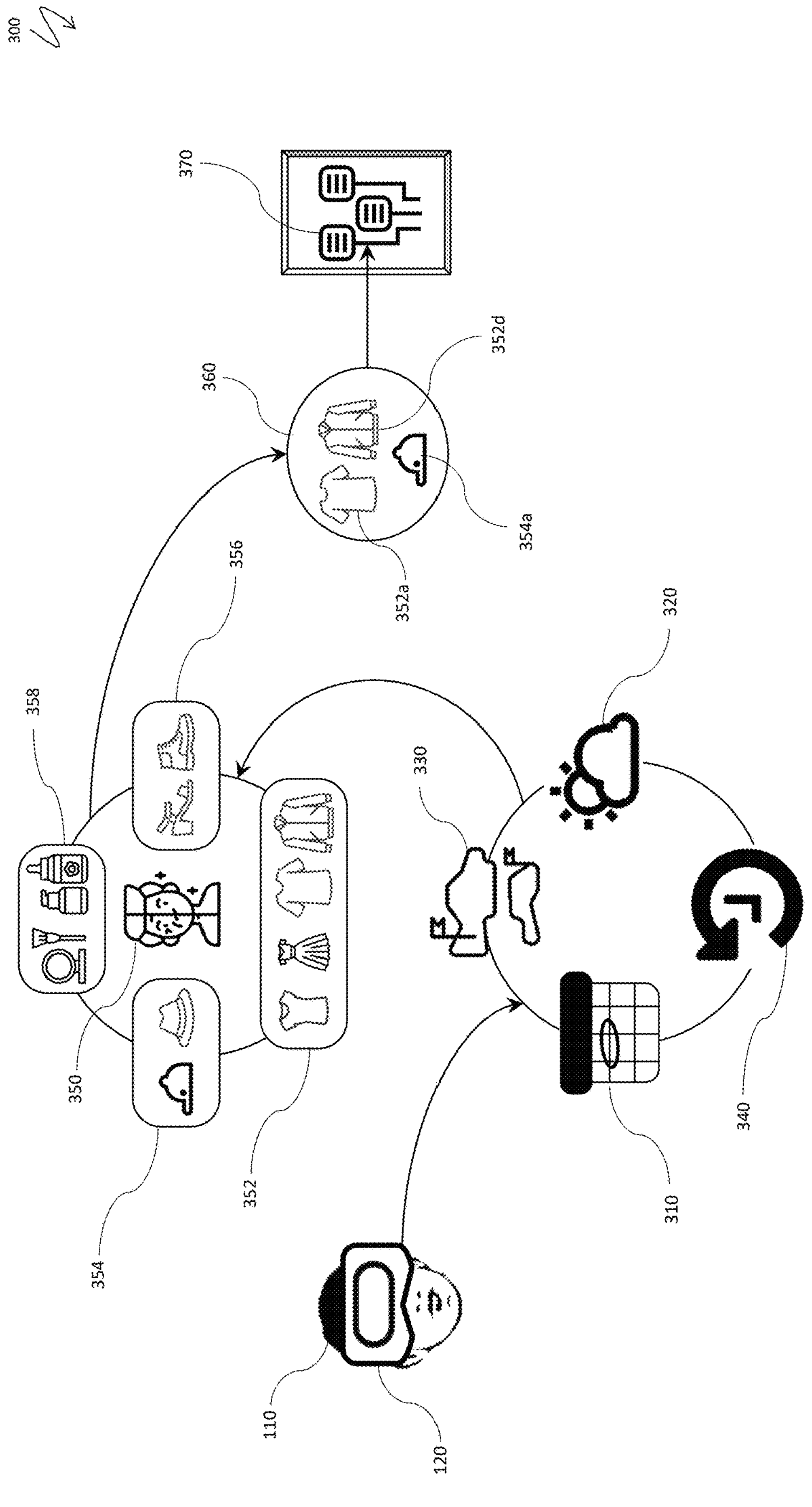
FIG. 3 is a schematic illustration of identifying presentation scenarios, according to an embodiment of the system described herein.

FIG. 3 is a schematic illustration 300 of identifying presentation scenarios. The system may offer modification and transformation capabilities for a natural reflection of the user 110 wearing the AR headset 120 based on a schedule and event list 310 of the user 110, on external conditions such as weather 320, on various conditions and limitations

330, described, in particular, in Section 7 of the Summary, on a history 340 of modifications and transformations, etc. The system may offer a set 350 of modification and transformation features, including clothing 352, headwear 354, footwear 356, cosmetics and makeup 358, etc. The user 110 or the system may choose, for example, a t-shirt 352*a*, a jacket 352*d*, and a baseball cap 354*a* to define a presentation scenario 370.

Figure 4:
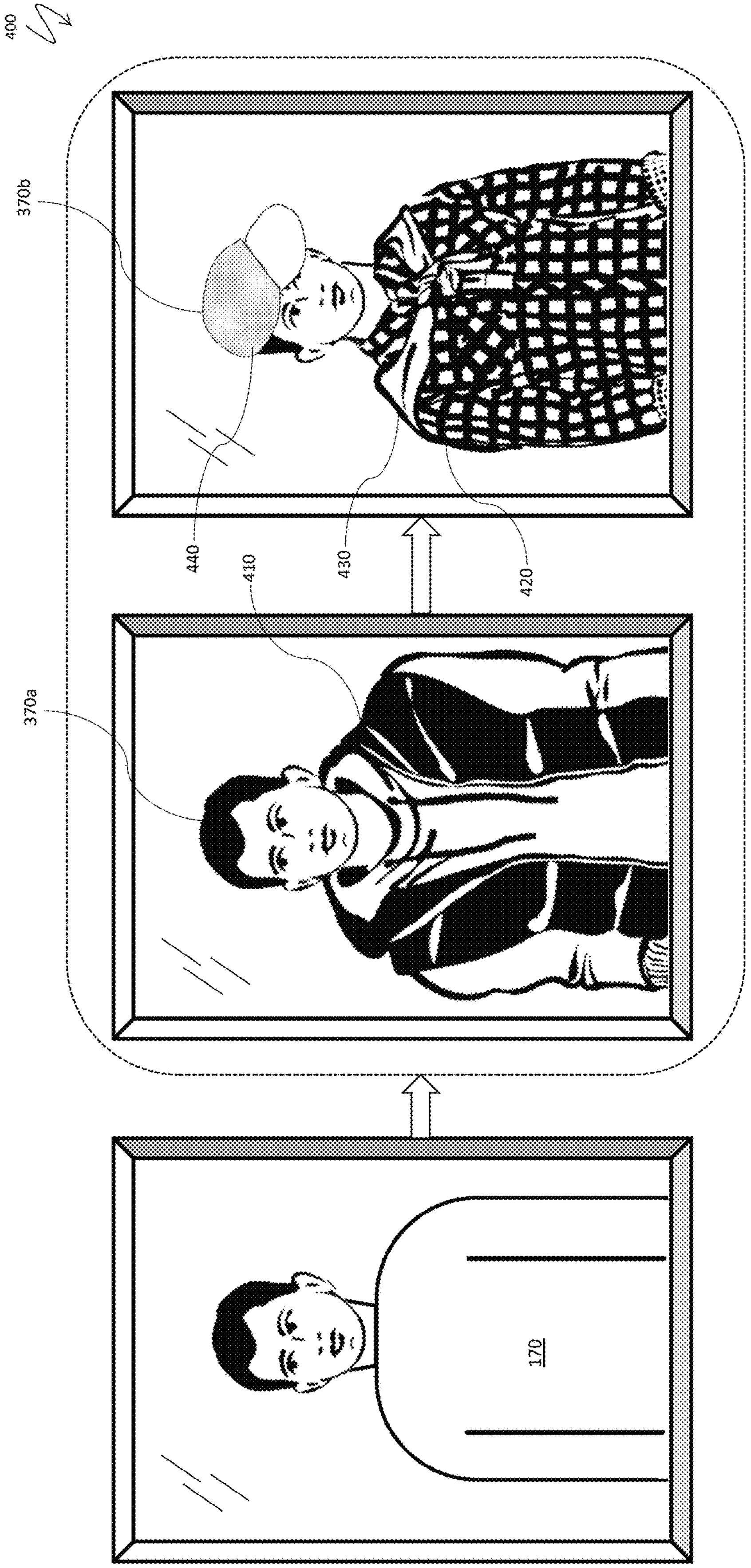
FIG. 4 is a schematic illustration of generating and replaying a VR presentation of modified user reflections, according to an embodiment of the system described herein.

FIG. 4 is a schematic illustration 400 of generating and replaying VR presentation of modified user reflections. A natural user reflection 170 built through the process explained in FIGS. 1-2 and supplemented with presentation scenario(s) identified using the route of FIG. 3, is modified according to two scenarios 370*a*, 370*b*, where in the first scenario 370*a* the user wears a jacket 410, and in the second scenario 370*b*, the user appearance is modified by adding a long-sleeve shirt 420, a scarf 430, and a cap 440. The two scenarios 370*a*, 370*b* represent what is presented to the user by the AR headset (i.e., what is seen by the user through the AR headset). The AR headset uses conventional AR/VR technology to superimpose items on the image of the user and to make other adjustments to provide the scenarios 370*a*, 370*b*. In some embodiments, the two scenarios 370*a*, 370*b* may be made visible to other users having an AR headset and/or having other appropriate electronic devices for viewing the two scenarios 370*a*, 370*b*.

Figure 5:
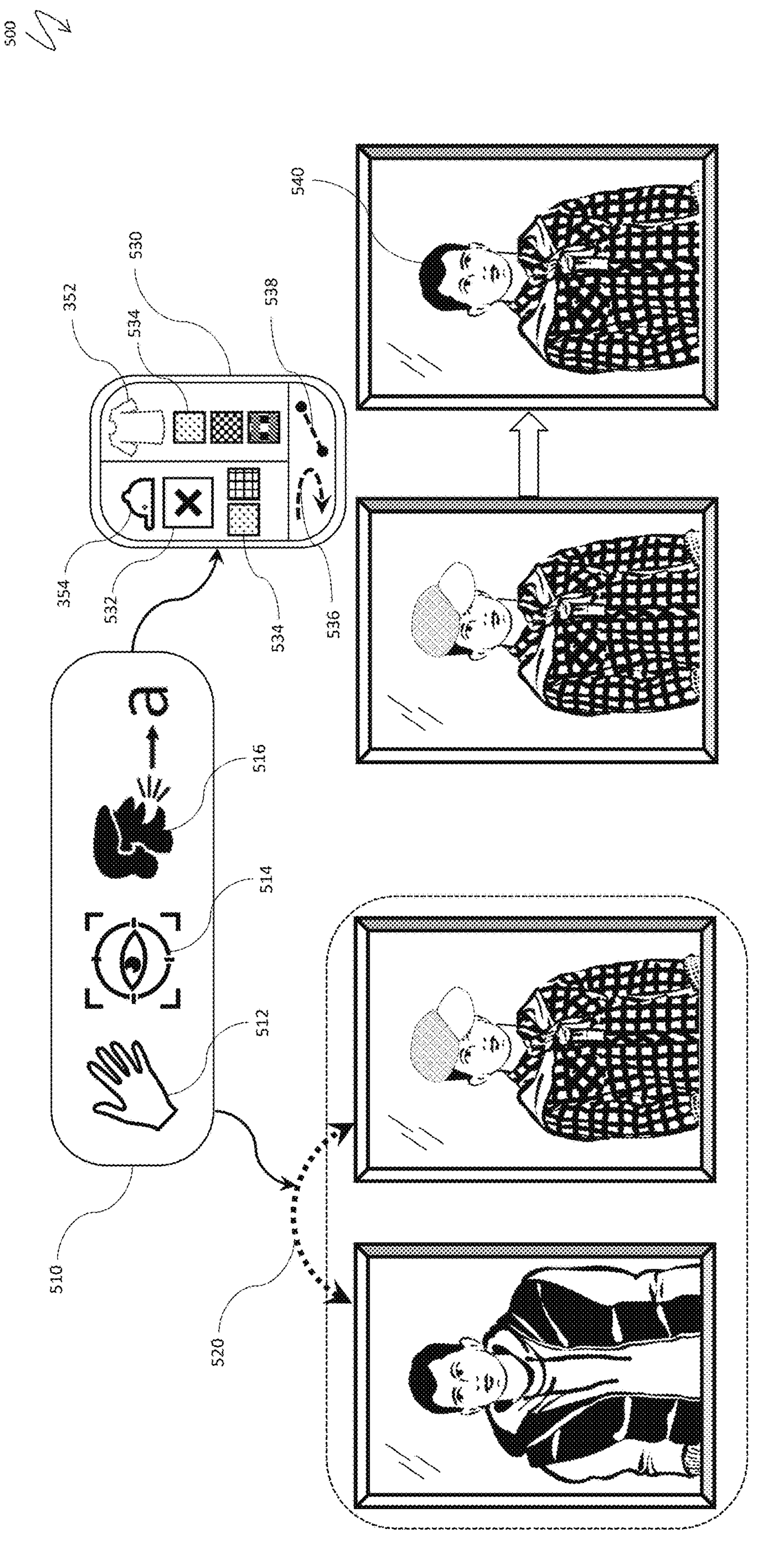
FIG. 5 is a schematic illustration of a VR presentation control by a user, according to an embodiment of the system described herein.

FIG. 5 is a schematic illustration 500 of the VR presentation control by a user. Examples of control mechanisms 510 include spatial gestures 512, gaze direction (eye-tracking technology) 514, and voice control 516. Navigation 520 between different scenarios may directly use any of the mechanisms 510. Additionally, the system may offer user tools for modifying user appearance in any particular scenario. One of the tools, mentioned above, is one or more spatial floating virtual menu(s) 530; in FIG. 5, the adjacent control mechanism 510 and the floating menu 530 control the appearance of clothing 352 by allowing a choice of patterns and colors 534; analogously, the look of a baseball cap for the headwear 354 may be altered by changing the patterns and color or the cap may be deleted altogether using a virtual button 532. Both the control mechanism 510 and the menu 530 allow user rotation 536 to view the modified reflection from different angles, and a tool 538 for changing user distance from the mirror to see more details (such as footwear) or to zoom in and view details of the clothing 354. The effect of the tool 532 (deleting the cap from the modified reflection) is illustrated in FIG. 5 by an item 540.

Figure 6:
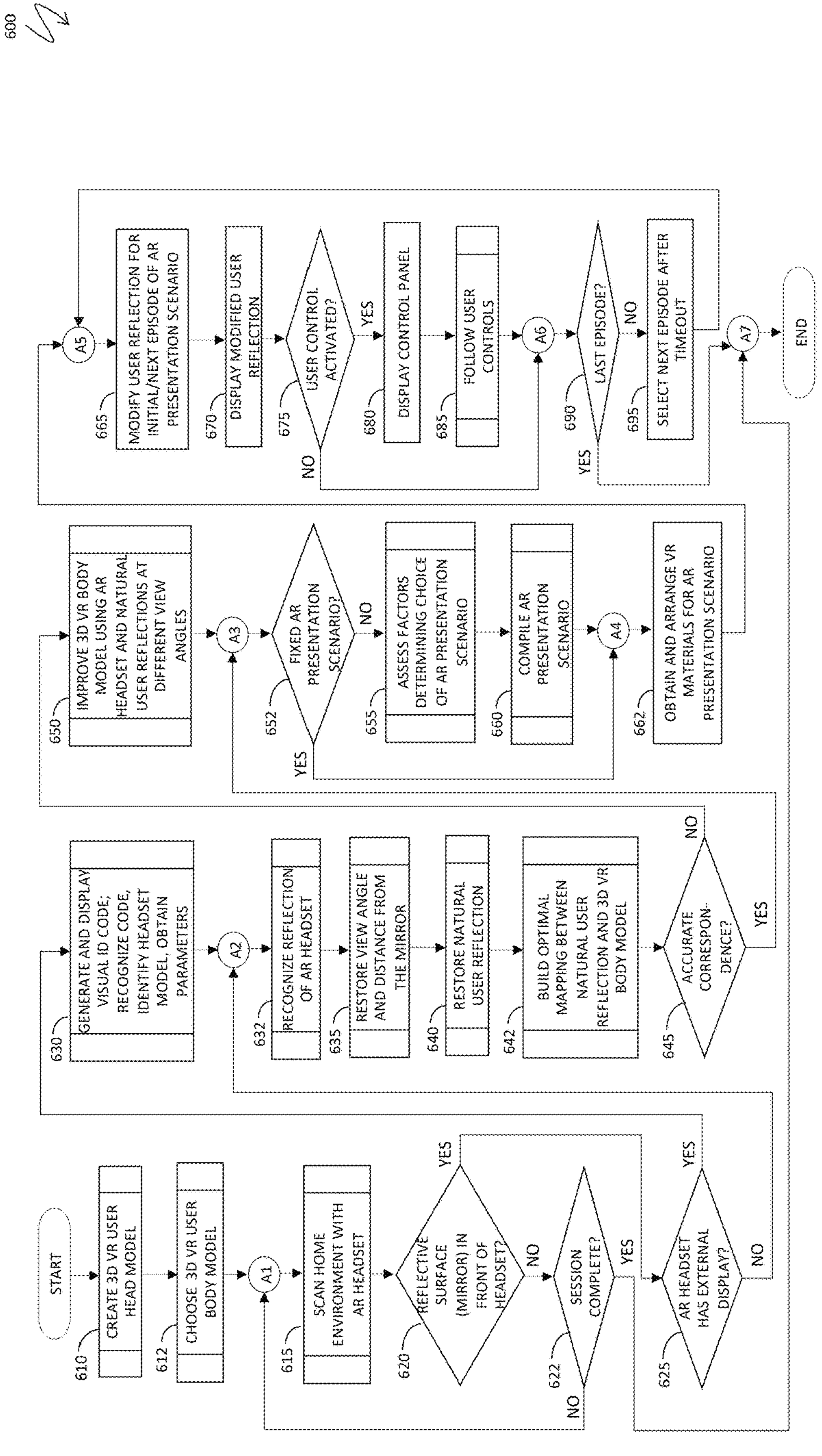
FIG. 6 is a system flow diagram illustrating system functioning in connection with building natural reflections and generating, replaying, and controlling VR presentations of modified natural user reflections, according to an embodiment of the system described herein.

Referring to FIG. 6, a system flow diagram 600 illustrates system functioning in connection with building natural reflections and generating, replaying, and controlling VR presentations of modified natural user reflections. Processing begins at a step 610, where the system associated with the AR headset creates a 3D VR user head model (the model may also have lower dimensions, such as 2.5D or 2D, which may limit presentation features). After the step 610, processing proceeds to a step 612, where a 3D VR user body model is chosen or created, as explained elsewhere herein (see, for example, FIG. 1 and the accompanying text). After the step 612, processing proceeds to a step 615, where a home environment is scanned with an AR headset of the user. After the step 615, processing proceeds to a test step 620, where it is determined whether a reflective surface, such as a mirror, is located in front of the AR headset. If not, processing proceeds to a test step 622, where it is determined whether the session is over. If so, processing is complete; otherwise, processing proceeds to a step 615, which may be independently reached from the step 612.

If it is determined at the test step 620 that a reflective surface is located in front of the AR headset, processing proceeds to a test step 620, where it is determined whether the AR headset has an external display. If so, processing proceeds to a step 630, where the system generates and displays on the external display visual ID code to identify the AR headset; recognizes the code, identifies the headset model and obtains necessary parameters (see details in FIG. 2 and in the accompanying text). After the step 630, processing proceeds to a step 632, where the reflection of the AR headset in the reflective surface (mirror) is recognized. Note that the step 632 may be independently reached from the test step 625 if it is determined that the AR headset does not have an external display. After the step 632, processing proceeds to a step 635, where a view angle and a distance of the user from the mirror is calculated (see FIG. 2, the accompanying text, and Section 2 of the Summary). After the step 635, processing proceeds to a step 640, where the natural user reflection is restored (see FIG. 1, the accompanying text, and Section 3 of the Summary). After the step 640, processing proceeds to a step 642, where an optimal mapping between the natural user reflection and the 3D VR body model is established. After the step 642, processing proceeds to a test step 645, where it is determined whether the correspondence is accurate. If not, processing proceeds to a step 650, where the system improves the 3D VR body model using AR headset and natural user reflections taken at different view angles, as explained in more detail in Section 8 of the Summary.

After the step 650, processing proceeds to a test step 652, where it is determined whether the system uses a fixed AR presentation scenario, as explained in Section 7 of the Summary. Note that the test step 652 may be independently reached from the test step 645 if it is determined that the correspondence is accurate. If it is determined at the test step 652 that the system does not us a fixed AR presentation scenario, processing proceeds to a step 655, where the system assesses factors determining choice of an AR presentation scenario (see FIG. 3 and the accompanying text for details). After the step 655, processing proceeds to a step 660, where a user or the system compiles an AR presentation scenario, as explained in connection with FIG. 3. After the step 660, processing proceeds to a step 662, where the system obtains and arranges VR materials for the compiled AR presentation scenario (see FIG. 3 and the accompanying text). Note that the test step 662 may be independently reached from the test step 652 if it is determined that the system uses a fixed AR presentation scenario.

After the step 662, processing proceeds to a step 665, where the system modifies a user reflection or a next episode of the current AR presentation scenario (for example, for user rotation or other movement related to the reflective surface/mirror). After the step 665, processing proceeds to a step 670, where the system displays modified user reflections according to the current AR presentation scenario. After the step 670, processing proceeds to a test step 675, where it is determined whether the user control of the current presentation scenario is activated. If so, processing proceeds to a step 680, where the system displays a control panel, such as spatial menus shown, for example, in FIG. 5. After the step 680, processing proceeds to a step 685, where the presentation flow and the appearance of modified user reflections follows user controls, as explained in FIG. 5 and the accompanying text. After the step 685, processing proceeds to a test step 690, where it is determined whether the current presentation episode is the last episode of the session. If so, processing is complete; otherwise, processing proceeds to a step 695, where the next AR/VR presentation episode is selected after a timeout. After the step 695, processing proceeds to the step 665, which may be independently reached from the step 662. Note that the test step 690 may be independently reached from the test step 675 if it is determined that the user control is not activated.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of using augmented reality to present a modified appearance of a user wearing an AR headset, comprising:

- detecting the user in a reflective surface;
- capturing geometric parameters of the AR headset in the reflective surface based on visible features of the AR headset;
- determining distance and rotation of the user with respect to the reflective surface based on the geometric parameters of the AR headset in the reflective surface;
- the AR headset presenting to the user, in response to the user being detected in the reflective surface, an image of the user in the reflective surface in which the user is not wearing the AR headset, wherein the image presented to the user depends, in part, on the distance and the rotation of the user;
- applying modifications and transformations to the image of the user; and
- the AR headset presenting to the user an image of the user with the modifications and transformations, wherein the AR headset has a display that provides an indication of the model of the headset that is used in connection with determining distance and rotation of the user with respect to the reflective surface.

2. The method of claim 1, wherein the modifications and transformations include modification of at least one of: clothes, headwear, footwear, cosmetics, or makeup.

3. The method of claim 1, wherein the user is presented with a control mechanism and a floating menu that the user actuates to perform at least one of: changing the modifications and transformations, rotating the image of the user, viewing the image of the user from different angles, or change a viewing distance of the image of the user.

4. The method of claim 3, wherein the control mechanism and the floating menu allow the user to alter at least one of: color, texture, material, fashion, and size options for attire, headwear position on a head of the user, or an option of removing headwear.

5. The method of claim 4, wherein the user controls the control mechanism and the floating menu using at least one of: spatial gestures, eye tracking, or voice commands.

6. The method of claim 1, wherein the image of the user includes a model of a head of the user obtained by the AR headset combined with a model of a body of the user.

7. The method of claim 6, wherein the model of the body of the user is initially chosen from a repository containing models based on parameters that include body type, age, height, and basic dimensions.

8. The method according to claim 7, wherein the user chooses the model from the repository.

9. The method of claim 1, wherein the indication is a QR code.

10. The method of claim 1, wherein the AR headset has a display that provides a series of geometric configurations that are used to determine the distance and rotation of the user with respect to the reflective surface.

11. The method of claim 1, wherein determining distance and rotation of the user with respect to the reflective surface includes using optical parameters of the reflective surface.

12. A non-transitory computer readable medium containing software that uses augmented reality to present a modified appearance of a user wearing an AR headset, the software comprising:

- executable code that detects the user in a reflective surface;
- executable code that captures geometric parameters of the AR headset in the reflective surface based on visible features of the AR headset;
- executable code that determines distance and rotation of the user with respect to the reflective surface based on the geometric parameters of the AR headset in the reflective surface;
- executable code that causes the AR headset to present to the user, in response to the user being detected in the reflective surface, an image of the user in the reflective surface in which the user is not wearing the AR headset, wherein the image presented to the user depends, in part, on the distance and the rotation of the user;
- executable code that applies modifications and transformations to the image of the user; and
- executable code that causes the AR headset to present to the user an image of the user with the modifications and transformations, wherein the AR headset has a display that provides an indication of the model of the headset that is used in connection with determining distance and rotation of the user with respect to the reflective surface.

13. The non-transitory computer readable medium of claim 12, wherein the modifications and transformations include modification of at least one of: clothes, headwear, footwear, cosmetics, or makeup.

14. The non-transitory computer readable medium of claim 12, wherein the user is presented with a control mechanism and a floating menu that the user actuates to perform at least one of: changing the modifications and transformations, rotating the image of the user, viewing the image of the user from different angles, or change a viewing distance of the image of the user.

15. The non-transitory computer readable medium of claim 14, wherein the control mechanism and the floating menu allow the user to alter at least one of: color, texture, material, fashion, and size options for attire, headwear position on a head of the user, or an option of removing headwear and wherein the user controls the control mechanism and the floating menu using at least one of: spatial gestures, eye tracking, or voice commands.

16. The non-transitory computer readable medium of claim 12, wherein the indication is a QR code.

17. The non-transitory computer readable medium of claim 12, wherein the AR headset has a display that provides a series of geometric configurations that are used to determine the distance and rotation of the user with respect to the reflective surface.

18. The non-transitory computer readable medium of claim 12, wherein executable code that determines distance and rotation of the user with respect to the reflective surface uses account optical parameters of the reflective surface.

* * * * *